United States Patent
Biswas et al.

(10) Patent No.: US 12,200,322 B2
(45) Date of Patent: *Jan. 14, 2025

(54) SYSTEMS AND METHODS FOR GENERATING A VIDEO SUMMARY OF A VIRTUAL EVENT

(71) Applicant: Verizon Patent and Licensing Inc., Basking Ridge, NJ (US)

(72) Inventors: Subham Biswas, Thane (IN); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,764

(22) Filed: Dec. 19, 2023

(65) Prior Publication Data

US 2024/0121487 A1 Apr. 11, 2024

Related U.S. Application Data

(63) Continuation of application No. 17/811,732, filed on Jul. 11, 2022, now Pat. No. 11,889,168.

(51) Int. Cl.
*H04N 21/8549* (2011.01)
*G10L 15/02* (2006.01)

(52) U.S. Cl.
CPC ......... *H04N 21/8549* (2013.01); *G10L 15/02* (2013.01); *G10L 2015/025* (2013.01)

(58) Field of Classification Search
CPC ............. H04N 21/8549; G10L 15/02; G10L 2015/025; G10L 21/10; G10L 13/033; G10L 13/08

USPC .......................................................... 386/241
See application file for complete search history.

(56) References Cited

U.S. PATENT DOCUMENTS

| 8,209,623 | B2 | 6/2012 | Barletta et al. |
| 8,296,797 | B2* | 10/2012 | Olstad ................... G06F 3/0485 725/86 |
| 9,635,307 | B1* | 4/2017 | Mysore Vijaya Kumar ................ G06T 7/90 |
| 10,096,033 | B2 | 10/2018 | Heath |

(Continued)

OTHER PUBLICATIONS

"ToPhonetics", Accessed on Jul. 8, 2022, 1 page. [Retrieved from https://tophonetics.com/].

(Continued)

*Primary Examiner* — Helen Shibru

(57) ABSTRACT

A video summary device may generate a textual summary of a transcription of a virtual event. The video summary device may generate a phonemic transcription of the textual summary and generate a text embedding based on the phonemic transcription. The video summary device may generate an audio embedding based on a target voice. The video summary device may generate an audio output of the phonemic transcription uttered by the target voice. The audio output may be generated based on the text embedding and the audio embedding. The video summary device may generate an image embedding based on video data of a target user. The image embedding may include information regarding images of facial movements of the target user. The video summary device may generate a video output of different facial movements of the target user uttering the phonemic transcription, based on the text embedding and the image embedding.

20 Claims, 11 Drawing Sheets

(56) References Cited

U.S. PATENT DOCUMENTS

| | | |
|---|---|---|
| 10,582,149 B1 * | 3/2020 | Mysore Vijaya Kumar ................ H04N 21/2743 |
| 11,334,618 B1 | 5/2022 | Adlersberg et al. |
| 11,605,402 B2 * | 3/2023 | Xu ........................ G11B 27/036 |
| 11,616,658 B2 * | 3/2023 | Hu ....................... H04L 12/1831 709/204 |
| 2012/0284276 A1 | 11/2012 | Fernando et al. |
| 2016/0014482 A1 | 1/2016 | Chen et al. |
| 2021/0081056 A1 | 3/2021 | Divakaran et al. |
| 2022/0067385 A1 * | 3/2022 | Kaushik ................. G06N 20/00 |
| 2023/0140369 A1 * | 5/2023 | Aminian ............... G06F 16/739 382/103 |
| 2023/0169990 A1 | 6/2023 | Biswas et al. |
| 2023/0283851 A1 | 9/2023 | Stathacopoulos |
| 2024/0020337 A1 * | 1/2024 | Maharana ............. G06F 40/284 |
| 2024/0037824 A1 * | 2/2024 | Biswas .................. G06T 13/40 |
| 2024/0095449 A1 * | 3/2024 | Ranganathan ........ G06F 40/216 |
| 2024/0223872 A1 * | 7/2024 | Sharma ............ H04N 21/47217 |

OTHER PUBLICATIONS

Bernard, et al., "Phonemizer", GitHub, bootphon, 2021, 3 pages. [Retrieved from https://github.com/bootphon/phonemizer].

Jurafsky, et al., "Switchboard SWBD-DAMSL Shallow-Discourse-Function Annotation Coders Manual, Draft 13", University of Colorado at Boulder & +SRI International, Aug. 1, 1997, 32 pages. Retrieved from https://web.stanford.edu/~jurafsky/ws97/manual.august1.html (WS-97 Switchboard DAMSL Coders Manual (stanford.edu).

Mortensen, "epitran 1.22", Python Package Index (PyPI), Jun. 11, 2022, 24 pages. [Retrieved from https://pypi.org/project/epitran/].

\* cited by examiner

SYSTEMS AND METHODS FOR GENERATING A VIDEO SUMMARY OF A VIRTUAL EVENT

RELATED APPLICATION

This application is a continuation of U.S. patent application Ser. No. 17/811,732, entitled "SYSTEMS AND METHODS FOR GENERATING A VIDEO SUMMARY OF A VIRTUAL EVENT," filed Jul. 11, 2022, which is incorporated herein by reference in its entirety.

BACKGROUND

A virtual meeting may enable participants, in various locations, to use audio, video, and text to share information over the Internet in real time or near real time. A recording of the virtual meeting may be generated and provided to devices of the participants. Additionally, or alternatively, a transcription of the virtual meeting may be generated and provided to the devices of the participants.

DETAILED DESCRIPTION OF PREFERRED EMBODIMENTS

Figure 1A:
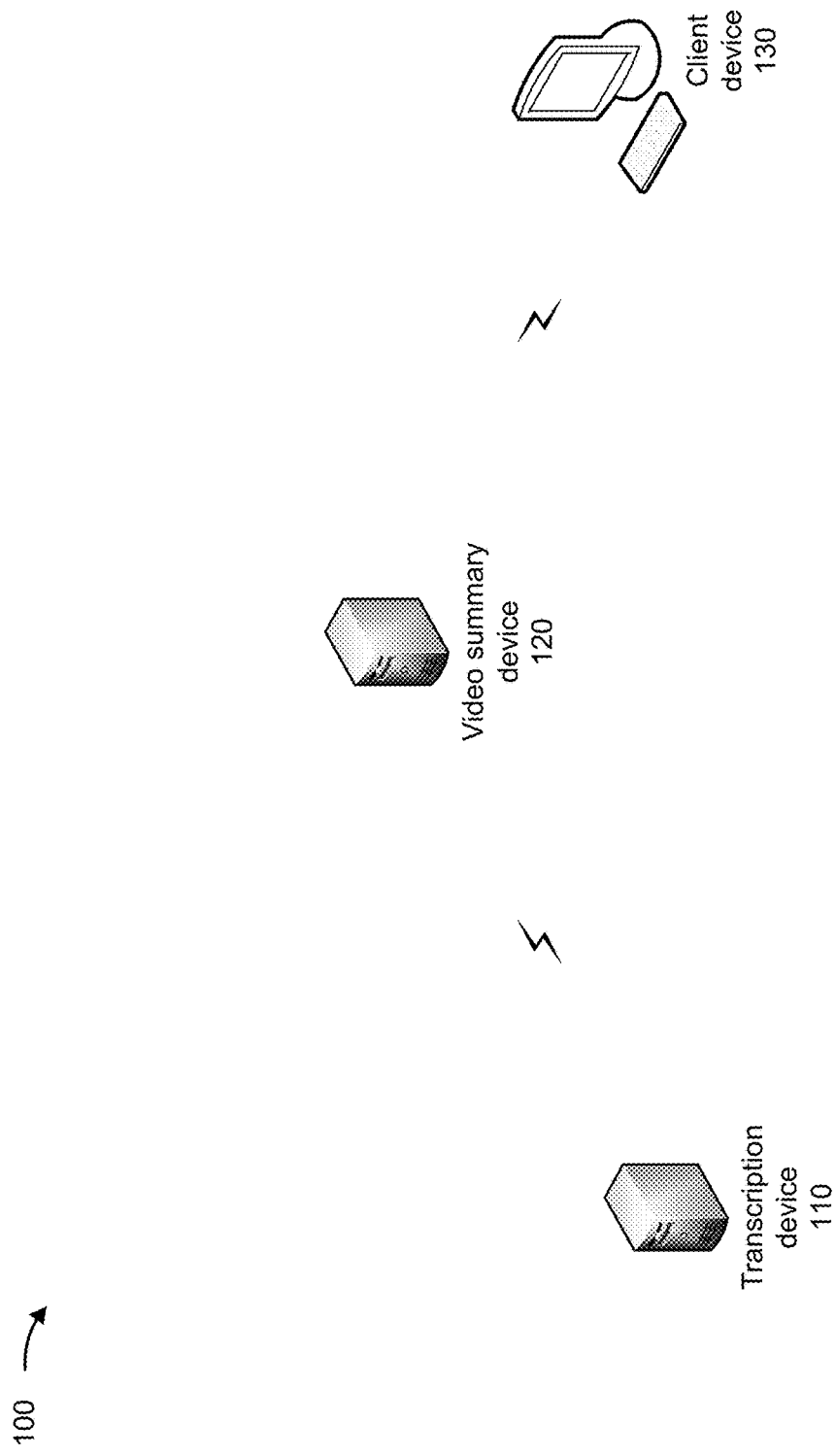
FIGS. 1A-1H are diagrams of an example associated with generating a video summary of a virtual event.

The following detailed description of example implementations refers to the accompanying drawings. The same reference numbers in different drawings may identify the same or similar elements.

Transcriptions of virtual meetings may be generated and provided to a user device. The transcriptions may enable a user of the user device to identify relevant content that was shared or discussed during the virtual meetings. The transcriptions are typically in a textual format. Accordingly, the transcriptions do not provide any visual insight regarding the virtual meetings.

In some situations, a length of each transcription may be substantial. Therefore, using the user device to process each transcription and review the content of an entirety of each transcription is a time consuming process. In this regard, using the user device to process each transcription and review the content of each transcription consumes network resources associated with providing the transcriptions, consumes storage resources associated with storing the transcriptions, and consumes computing resources associated with processing the transcriptions, among other examples.

Implementations described herein are directed to generating a video summary of a virtual event. A "virtual event" may include a video conference, a virtual meeting, an online event, and/or a webinar, among other examples. In some examples, a video summary device may generate a textual summary of a transcription of the virtual event. The video summary device may generate a phonemic transcription of the textual summary and generate a text embedding based on the phonemic transcription. A "phonemic transcription" may include a sequence of phonemes corresponding to a sequence of text included in the textual summary. The text embedding may include information regarding text classification of the phonemic transcription. As an example, the text embedding may be generated based on a text classification model. The text embedding may include information regarding relationships between different portions of the phonemic transcription.

The video summary device may generate an audio embedding based on a target voice. The audio embedding may include information regarding audio classification of the target voice. As an example, the audio embedding may be generated based on an audio classification model. In some instances, the audio embedding may include information regarding an amplitude of the target voice, a frequency of the target voice, an emotion conveyed by the target voice, and/or a tone of the target voice, among other examples. The video summary device may generate an audio output of the phonemic transcription uttered by the target voice. The audio output may be generated based on the text embedding and the audio embedding.

The video summary device may generate an image embedding based on video data of a target user. The video embedding may include information regarding images of facial movements of the target user uttering different words and/or phrases. The video summary device may generate a video output of the target user uttering the phonemic transcription. The video output may include images of different facial movements of the target user as the target user utters the phonemic transcription.

The video summary device may combine the audio output and the video output to generate a video summary of the virtual event. By generating the video summary in this manner, the video summary device may provide visual insight regarding the virtual event (unlike a transcription of the virtual event). By generating the video summary in this manner, the video summary device may preserve network resources, storage resources, and/or computing resources, among other examples, associated with obtaining, storing, and/or processing transcriptions of virtual events.

FIGS. 1A-1H are diagrams of an example 100 associated with generating a video summary of a virtual event. As shown in FIGS. 1A-1H, example 100 includes a transcription device 110, a video summary device 120, and a client device 130. Transcription device 110, video summary device 120, and client device 130 are described in more detail below in connection with FIG. 2 and FIG. 3.

Transcription device 110 may include one or more devices configured to generate a transcription of a virtual event. For example, transcription device 110 may receive audio data of the virtual event and generate the transcription of the virtual event based on the audio data.

Video summary device 120 may include one or more devices configured to generate a video summary of the virtual event based on the transcription of the virtual event. For example, video summary device 120 may receive the transcription of the virtual event from transcription device 110 and generate the video summary of the virtual event based on the transcription, as explained in more detail below. In some examples, video summary device 120 may be part of an edge computing environment.

Client device 130 may be configured to receive the video summary generated by video summary device 120 and provide, for display, the video summary to a user associated with client device 130. In some implementations, client device 130 may receive the transcription of the virtual event from transcription device 110 and provide the transcription to video summary device 120 (instead of transcription device 110 providing the transcription to video summary device 120). In some examples, client device 130 may be associated with a participant of a plurality of participants of the virtual event.

Figure 1B:
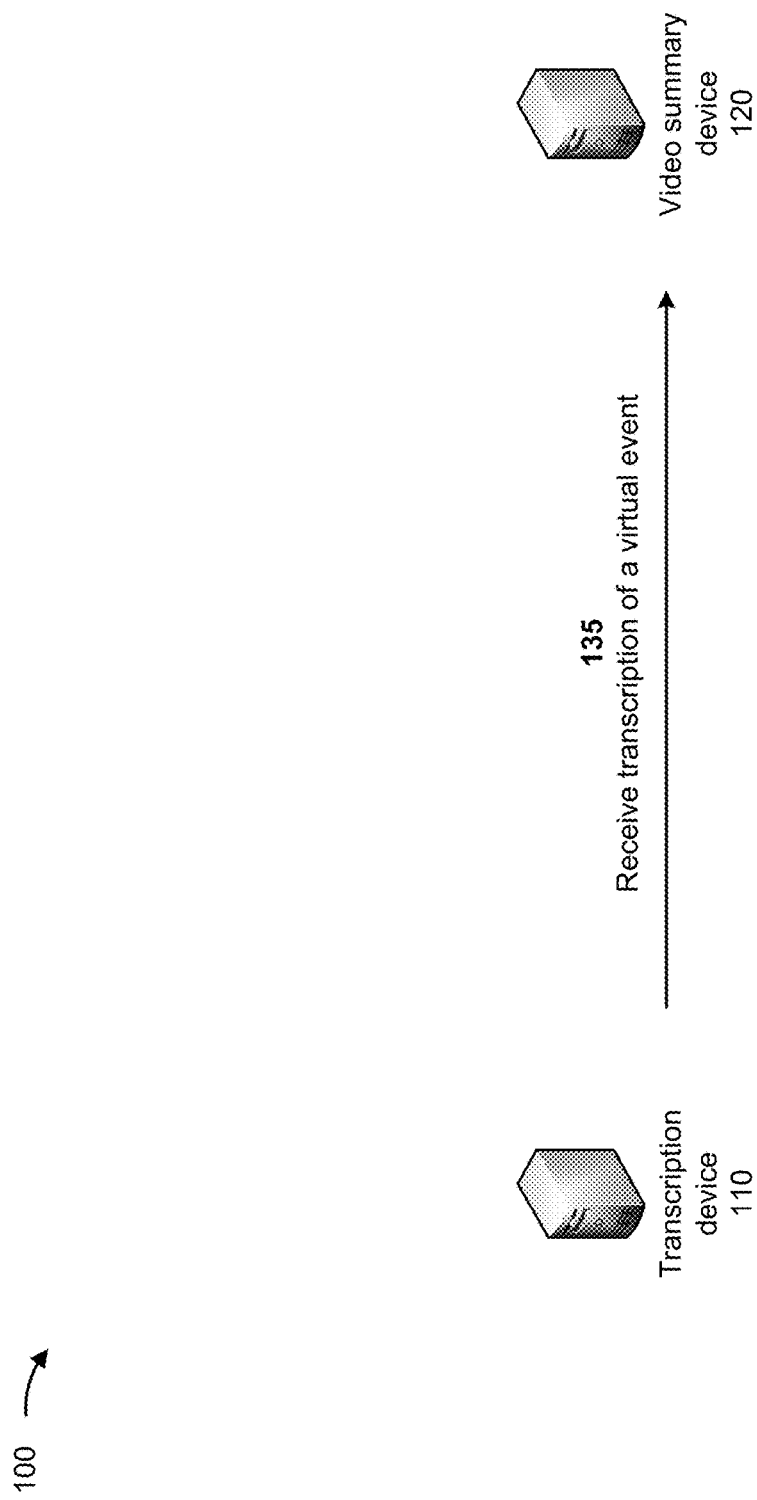

As shown in FIG. 1B, and by reference number 135, video summary device 120 may receive the transcription of the virtual event. For example, after transcription device 110 generates the transcription of the virtual event, transcription device 110 may provide the transcription to video summary device 120. In some implementations, video summary device 120 may receive the transcription of the virtual event from transcription device 110 periodically (e.g., every two hours, every four hours, and/or every day, among other examples).

Additionally, or alternatively, video summary device 120 may receive the transcription of the virtual event from transcription device 110 based on a trigger (e.g., based on a request provided by video summary device 120 to transcription device 110, based on a request provided by client device 130 to video summary device 120, or based on a request provided by client device 130 to transcription device 110, among other examples). In some examples, the requests may be associated with generating the video summary of the virtual event.

Alternatively, transcription device 110 may provide the transcription of the virtual event to client device 130, and client device 130 may provide the transcription to video summary device 120. Client device 130 may provide the transcription of the virtual event periodically and/or provide the transcription of the virtual event based on a trigger, in a manner similar to the manner described above.

Figure 1C:
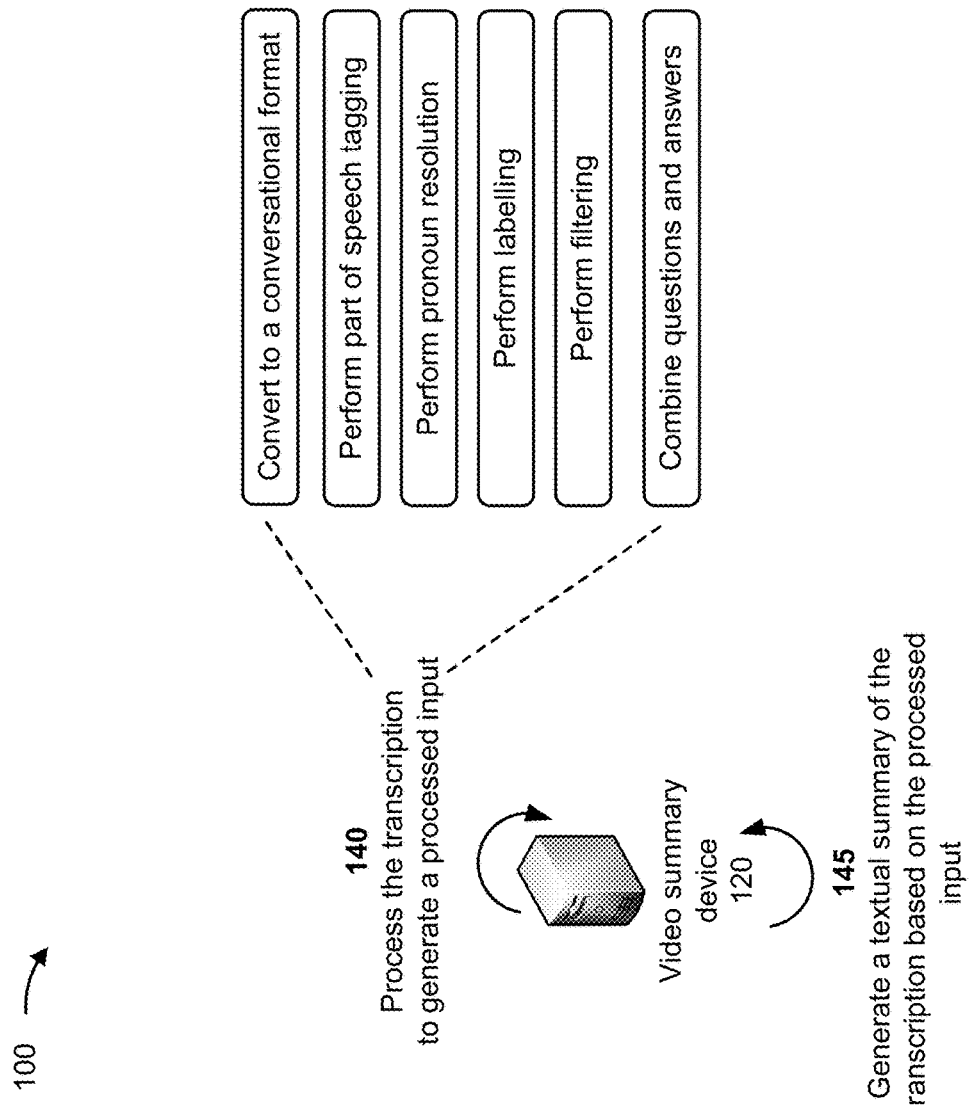

As shown in FIG. 1C, and by reference number 140, video summary device 120 may process the transcription to generate a processed input. For example, after receiving the transcription of the virtual event, video summary device 120 may process the transcription. In some implementations, when processing the transcription of the virtual event, video summary device 120 may convert the transcription to a conversational format. As an example, video summary device 120 may remove one or more portions of the transcription of the virtual event. For example, video summary device 120 may remove timestamps, indications of pauses, and/or line identifiers for different lines of the transcription, among other examples. As another example, video summary device 120 may convert the transcription from a JavaScript Object Notation format to a format that identifies each speaker and an utterance of each speaker.

Additionally, or alternatively, to converting the transcription to the conversational format, video summary device 120 may perform part-of-speech tagging. For example, video summary device 120 may analyze the transcription of the virtual event to identify different portions of the transcription and assign tags to the different portions (e.g., identify and assign tags to different components of a grammatical structure of the transcription). In some implementations, video summary device 120 may analyze and identify the different portions of the transcription of the virtual event using a natural language tool kit.

As an example, video summary device 120 may identify first words that are pronouns and assign tags indicating that the first words are pronouns, may identify second words that are nouns and assign tags indicating that the second words are nouns, may identify third words that are verbs and assign tags indicating that the third words are verbs, and/or so on.

Additionally, or alternatively, to performing part-of-speech tagging, video summary device 120 may perform a pronoun resolution process. For example, video summary device 120 may identify one or more pronouns included in the transcription, based on the tags, and replace the one or more pronouns with information identifying a respective participant of the plurality of participants of the virtual event. For example, if a participant named André uttered the phrase "I would like to switch subjects," video summary device 120 may modify the phrase to "André would like to switch subjects." In some examples, for a particular phrase, the transcription may include information identifying a particular participant who uttered the particular phrase. Accordingly, video summary device 120 may determine the information identifying the particular participant based on information provided with the phrase.

Additionally, or alternatively, to performing pronoun resolution, video summary device 120 may perform a labelling process. For example, video summary device 120 may determine a type of utterance for each phrase of the transcription of the virtual event. For instance, a particular phrase may be a salutation, a statement that provides an opinion, a statement that does not provide an opinion, an acknowledgement, a question eliciting a yes answer or a no answer, and/or a valediction, among other examples. Video summary device 120 may determine or provide, for each phrase, an indication (e.g., a label) of the type of utterance of the phrase.

Additionally, or alternatively, to performing the labelling process, video summary device 120 may perform a filtering process. For example, video summary device 120 may filter the phrases of the transcription to remove one or more phrases associated with one or more types of utterances. For instance, video summary device 120 may filter the phrases of the transcription to remove one or more phrases that are salutations and/or that are valedictions. Additionally, or alternatively, to performing the filtering process, video summary device 120 may combine questions from the transcription with corresponding answers from the transcription.

As shown in FIG. 1C, and by reference number 145, video summary device 120 may generate a textual summary of the transcription based on the processed input. For example, after generating the processed input, video summary device 120 may generate a textual summary of the transcription of the event using the processed input. In some implementations, video summary device 120 may use a language model to generate the textual summary. For example, video summary device 120 may provide the processed input as an input to the language model and the language model may generate, as an output, the textual summary.

In some examples, the language model may be a model that has been trained to determine relationships between different words and phrases (e.g., a relationship between an adjective and a noun, a relationship between a verb and a noun, and/or a relationship between two nouns, among other examples). For instance, the language model may be a pre-trained model for generating textual summaries.

Additionally, or alternatively, video summary device 120 (and/or another device associated with video summary device 120) may train the language model to determine relationships between words, determine meanings of words, determine a location of a word of a first type with respect to a word of another type (e.g., a pronoun before a verb), among other examples. Accordingly, based on training the language model, the language model may generate textual summaries. In some situations, the language model may be a machine learning model.

Figure 1D:
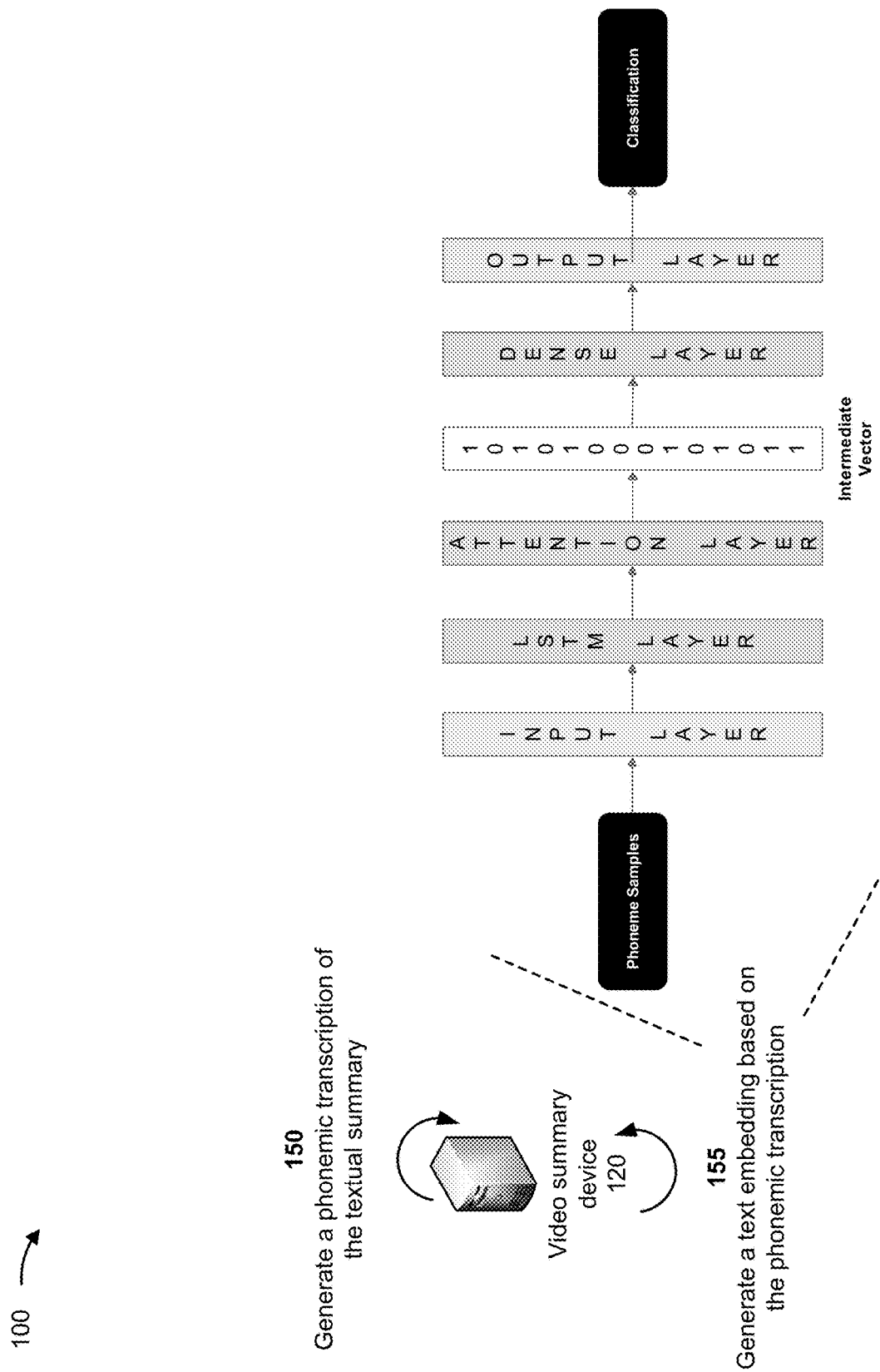

As shown in FIG. 1D, and by reference number 150, video summary device 120 may generate a phonemic transcription of the textual summary. For example, the phonemic transcription may include a sequence of phonemes representing words and other texts included in the textual summary. In some implementations, video summary device 120 may generate the textual summary using one or more algorithms configured to generate phonemic transcriptions of textual content based on textual summaries.

As shown in FIG. 1D, and by reference number 155, video summary device 120 may generate a text embedding based on the phonemic transcription. The text embedding may include information regarding grammatical rules associated with the textual summary, information regarding contexts associated with the textual summary, information regarding semantics associated with the textual summary, and/or information regarding emotions conveyed by the textual summary, among other examples.

In some implementations, video summary device 120 may generate the text embedding using a text embedding model. The text embedding model may be a machine learning model (e.g., a neural network model) trained for text classification (e.g., a text classification model). As an example, the text embedding model may be a sequential multilayer perceptron model (e.g., an attention-based neural network model). The text embedding model may be generated by removing a dense layer and an output layer of the text classification model. In this regard, an output of the text embedding model may be an intermediate vector of the text classification model.

In some examples, when generating the text embedding, video summary device 120 may provide the phonemic transcription (e.g., the sequence of phonemes) as an input to the text embedding model. The text embedding model may generate, as an output, the text embedding in the form of an intermediate vector (e.g., a dense intermediate vector) that includes numerical values. The numerical values may indicate the grammatical rules associated with the textual summary, the contexts associated with the textual summary, the semantics associated with the textual summary, and/or the emotions conveyed by the textual summary, among other examples.

Figure 1E:
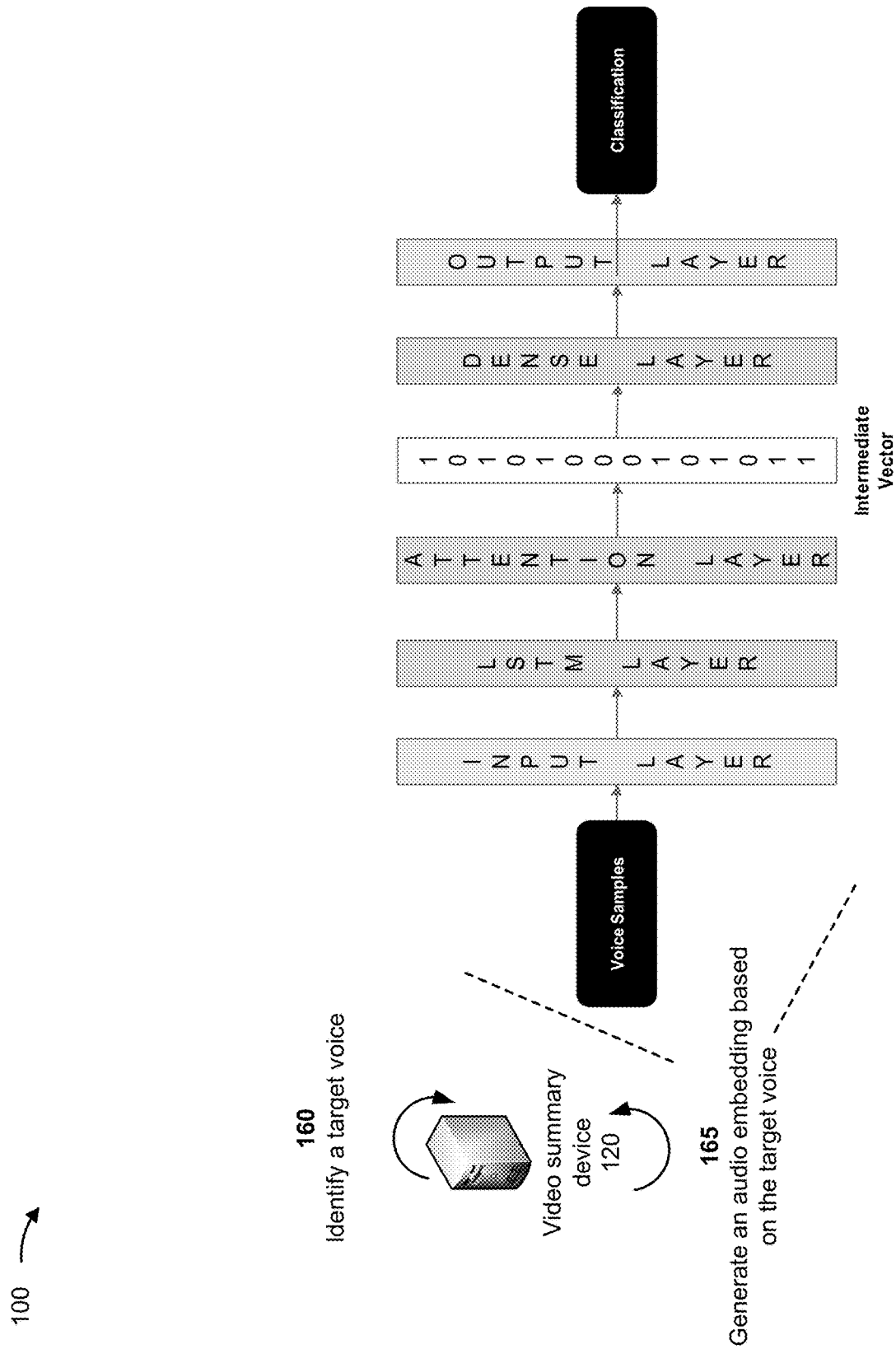

As shown in FIG. 1E, and by reference number 160, video summary device 120 may identify a target voice. In some examples, the target voice may be a voice of a participant of the plurality of participants of the virtual meeting. Alternatively, the target voice may be a voice of a user that was not a participant of the virtual meeting. In some implementations, video summary device 120 may receive information identifying the target voice from client device 130.

As shown in FIG. 1E, and by reference number 165, video summary device 120 may generate an audio embedding based on the target voice. The audio embedding may include information regarding an amplitude of the target voice, information regarding a frequency of the target voice, information regarding pauses during an utterance of the target voice, and/or information regarding a tone of the target voice, among other examples.

In some implementations, video summary device 120 may generate the audio embedding using an audio embedding model. The audio embedding model may be a machine learning model (e.g., a neural network model) trained for audio classification (e.g., an audio classification model). As an example, the audio embedding model may be a sequential multilayer perceptron model (e.g., an attention-based neural network model). Similarly to the text embedding model, the audio embedding model may be generated by removing a dense layer and an output layer of the audio classification model. In this regard, an output of the audio embedding model may be an intermediate vector of the audio classification model.

In some examples, when generating the audio embedding, video summary device 120 may provide various voice samples of the target voice as input to the audio embedding model. The voice samples may be generated based on the target voice uttering different words and/or phrases. The different words and/or phrases may be uttered in various tones and/or uttered according to various emotions, among other examples. The audio embedding model may generate, as an output, the audio embedding in the form of an intermediate vector (e.g., a dense intermediate vector) that includes numerical values. The numerical values may indicate the amplitude of the target voice, the frequency of the target voice, the pauses during the utterance, and/or the tone of the target voice, among other examples.

Figure 1F:
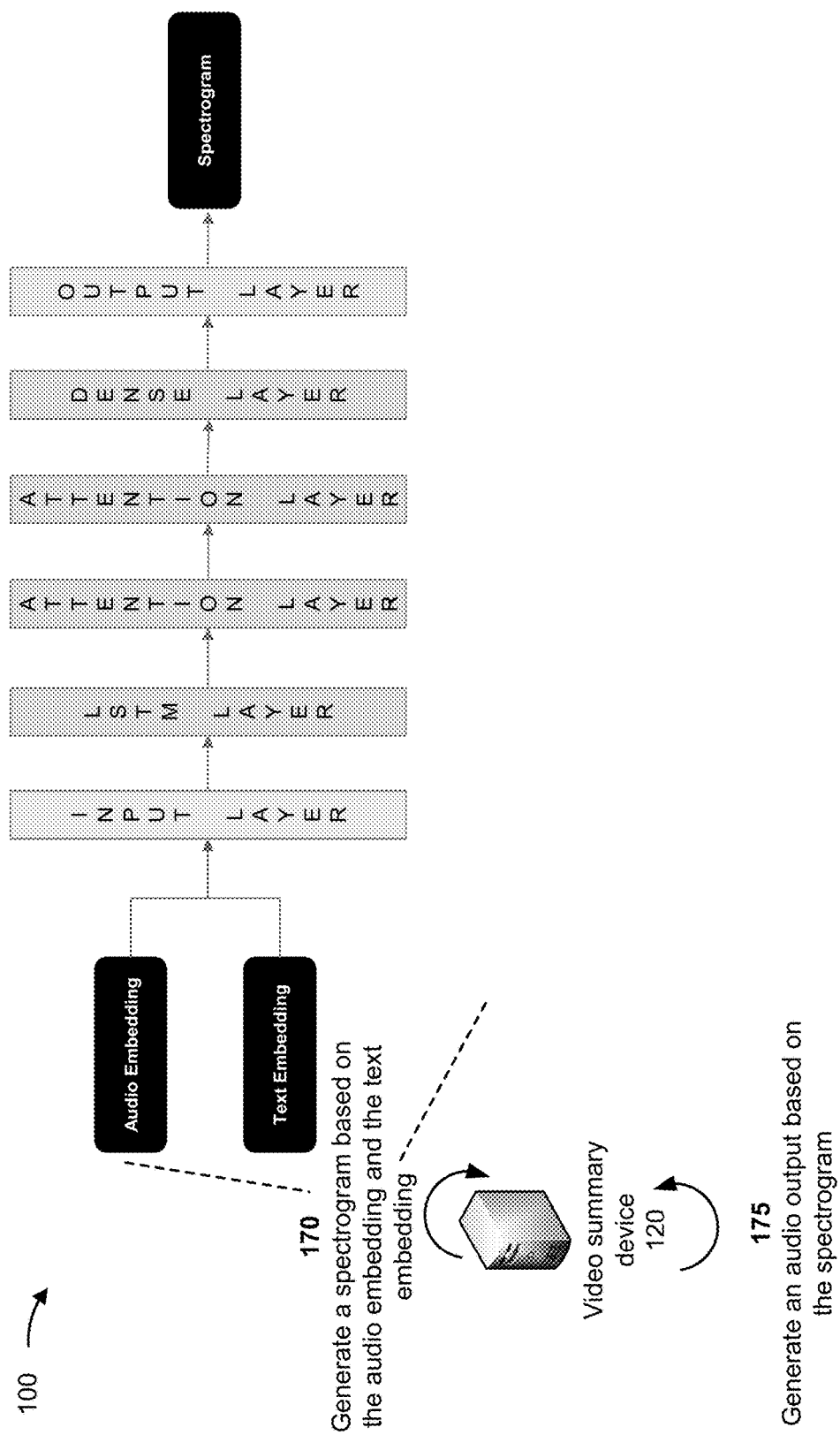

As shown in FIG. 1F, and by reference number 170, video summary device 120 may generate a spectrogram based on the audio embedding and the text embedding. In some implementations, video summary device 120 may generate the spectrogram by combining the audio embedding and the text embedding. For example, video summary device 120 may concatenate the audio embedding and the text embedding to generate a combined embedding. Video summary device 120 may provide the combined embedding as an input to a neural network model, and the neural network model may generate the spectrogram.

In some implementations, the neural network model may be a convolutional neural network (CNN). For example, the neural network may be a stacked CNN long short-term memory network. In some implementations, the spectrogram may be a three dimensional red, green, blue (RGB) array (e.g., width, height, 3). Pixel values of the spectrogram may range from 0 to 255. In this regard, the RGB array may indicate intensity values of 0 to 255 for the color red (e.g., a range of frequencies associated with the color red), indicate intensity values of 0 to 255 for the color green (e.g., a range of frequencies associated with the color green), and indicate intensity values of 0 to 255 for the color blue (e.g., a range of frequencies associated with the color blue). In some examples, the spectrogram may be a Mel spectrogram.

As shown in FIG. 1F, and by reference number 175, video summary device 120 may generate an audio output based on the spectrogram. For example, video summary device 120 may generate a waveform based on data of the spectrogram (e.g., convert the data of the spectrogram into the waveform). For instance, video summary device 120 may generate the waveform based on frequencies indicated by the pixel values. The audio output may include the waveform. Video summary device 120 may generate the waveform based on one or more algorithms for generating waveforms based on data of spectrograms.

In some examples, the audio output may be an output of the target voice uttering the phonemic transcription. In other words, the audio output may be an output of the target voice uttering the textual summary.

Figure 1G:
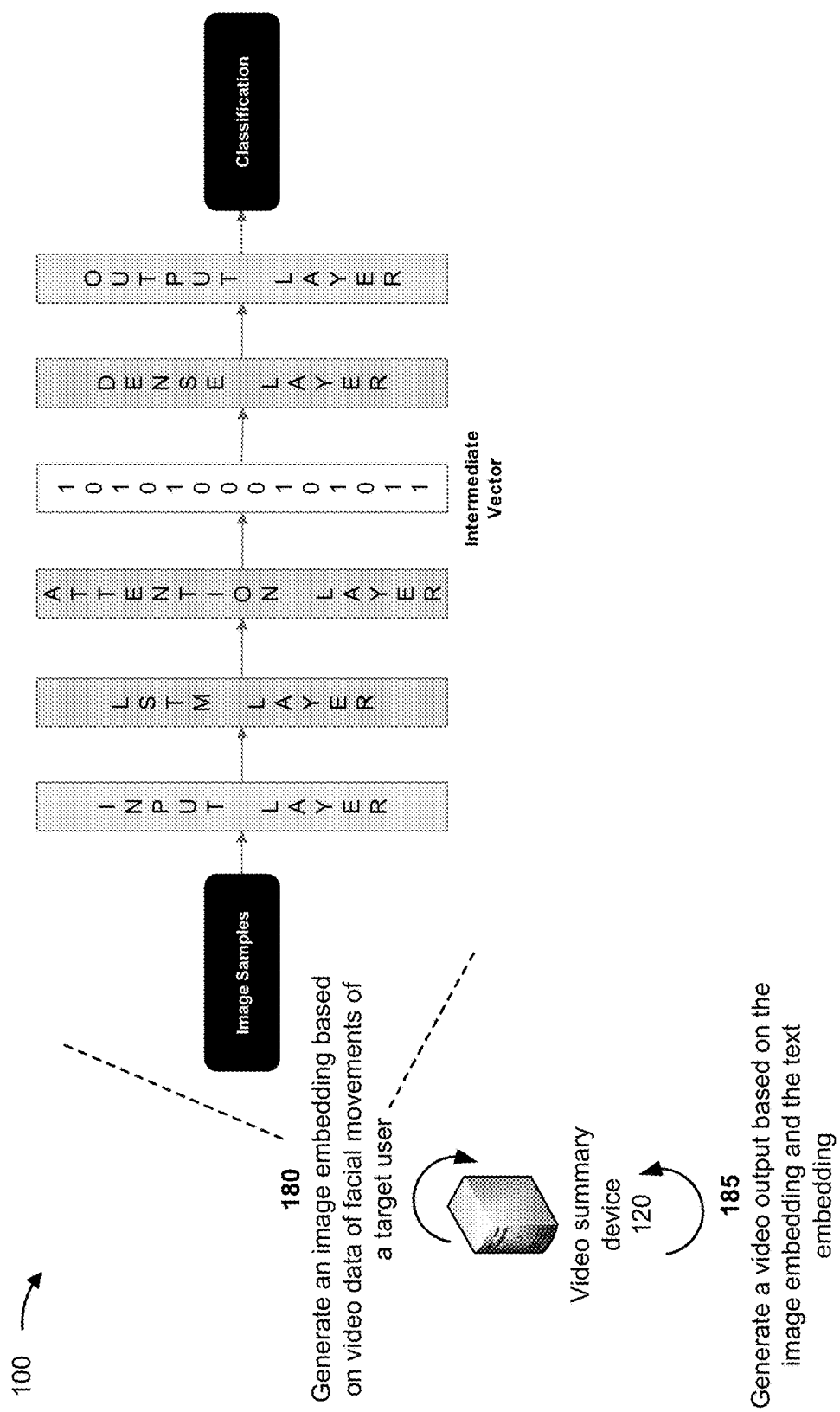

As shown in FIG. 1G, and by reference number 180, video summary device 120 may generate an image embedding based on video data of facial movements of a target user. In some implementations, video summary device 120 may identify the target user. As an example, the target user may be a participant of the plurality of participants of the virtual meeting. Alternatively, the target voice may be a voice of a user that was not a participant of the virtual meeting.

In some implementations, video summary device 120 may receive information identifying the target user from client device 130. In some implementations, video summary device 120 may identify the target user based on the target voice. For example, video summary device 120 may identify the target voice as the voice of the target user. Alternatively, the target voice may be the voice of a user different than the target user.

After identifying the target user, video summary device 120 may obtain video data of facial movements of the target user as the target user utters different words and/or phrases according to various tones and various emotions. The different words and phrases may be uttered in various tones and/or uttered according to various emotions, among other examples.

Video summary device 120 may obtain the video data from one or more memories associated with video summary device 120 and/or from client device 130, among other examples. Video summary device 120 may generate the image embedding based on the video data of the facial movements of the target user. The image embedding may include information regarding the facial movements of the target user.

In some implementations, video summary device 120 may generate the image embedding using an image embedding model. The image embedding model may be a machine learning model (e.g., a neural network model) trained for image classification (e.g., an image classification model). As an example, the image embedding model may be a sequential multilayer perceptron model (e.g., an attention-based neural network model). Similarly to the text embedding model, the image embedding model may be generated by removing a dense layer and an output layer of the image classification model. In this regard, an output of the audio embedding model may be an intermediate vector of the image classification model.

In some examples, when generating the image embedding, video summary device 120 may provide the video data (of the facial movements of the target user) as input to the text embedding model. The image embedding model may generate, as an output, the image embedding in the form of an intermediate vector (e.g., a dense intermediate vector) that includes numerical values. The numerical values may indicate the facial movements of the target user.

As shown in FIG. 1G, and by reference number 185, video summary device 120 may generate a video output based on the image embedding and the text embedding. In some implementations, video summary device 120 may generate the video output by combining the image embedding and the text embedding. For example, video summary device 120 may concatenate the image embedding and the text embedding to generate a combined embedding. Video summary device 120 may provide the combined embedding as an input to a neural network model, and the neural network model may generate the video output.

The video output may include images of the target user uttering each phoneme of the phonemic transcription in accordance with the sequence of the phonemes in the phonemic transcription. In some implementations, the neural network model may be an attention-based encoder-decoder network.

In some examples, when generating the video output, video summary device 120 may generate a plurality of images for each portion of a plurality of portions of the phonemic transcription. In other words, video summary device 120 may generate a plurality of images for each phoneme of the phonemic transcription, in accordance with the sequence of phonemes in the phonemic transcription. The plurality of images, of a particular portion of the plurality of portions of the phonemic transcription, may depict the target user uttering the particular portion (e.g., a particular phoneme). A first image may be an image of the target user starting to utter the particular phoneme, a second image may be an image of the target user continuing to utter the particular phoneme, and so on.

In some examples, video summary device 120 may generate an image for the particular phoneme based on a previous image generated for the particular phoneme. For example, video summary device 120 may generate the first image based on the text embedding and the image embedding corresponding to the particular phoneme as the target voice starts to utter the particular phoneme. Video summary device 120 may generate the second image based on the first image and based on the text embedding and the image embedding corresponding to the particular phoneme as the target voice continues to utter the particular phoneme.

In some implementations, when generating the second image based on the first image, video summary device 120 may modify one or more pixel values of the first image to generate the second image. Modifying the one or more pixel values in this manner may adjust a position of the eyebrows of the target user, a position of the eyelids of the target user, a position of the mouth of the target user, and so on. Video summary device 120 may repeat the above actions until images have been generated for all phonemes included in the phonemic transcription.

Figure 1H:
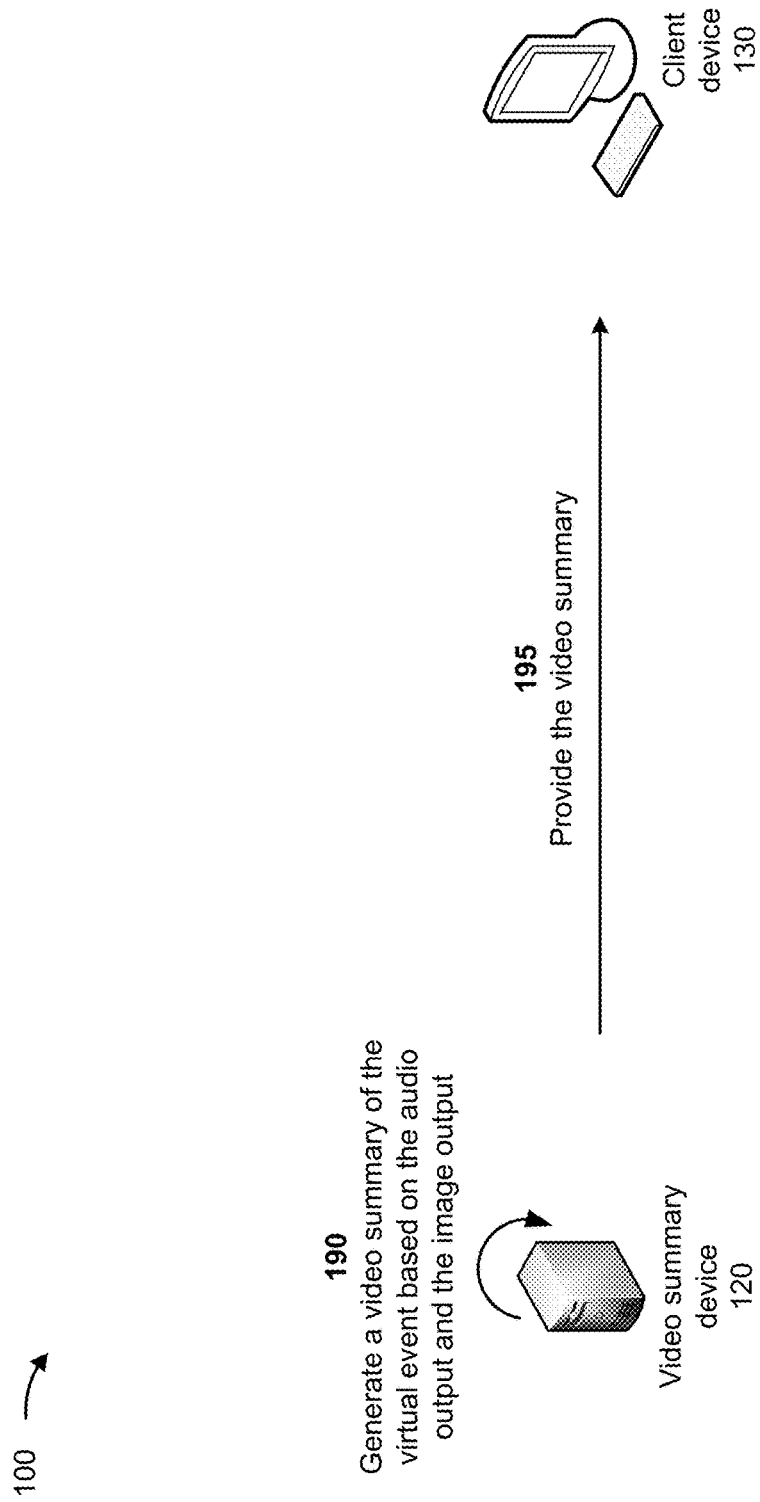

As shown in FIG. 1H, and by reference number 190, video summary device 120 may generate a video summary of the virtual event based on the audio output and the image output. For example, video summary device 120 may combine the audio output and the image output to generate the video summary. Video summary device 120 may combine the audio output and the image output in a manner that ensures that each phoneme uttered by the target voice matches the facial movements of the target user uttering the phoneme.

In some implementations, video summary device 120 may encode the video output using a video codec (e.g., in accordance with a desired container and/or a desired format). In some examples, video summary device 120 may encode the video output based on input from client device 130 (e.g., based on input identifying the video codec).

As shown in FIG. 1H, and by reference number 195, video summary device 120 may provide the video summary. For example, video summary device 120 may provide the video summary to client device 130. In some implementations, video summary device 120 may provide the video summary to client device 130 based on a trigger, such as a request from client device 130, among other examples. Additionally, or alternatively, video summary device 120 may provide the video summary to client device 130 periodically.

By generating the video summary as described herein, video summary device 120 may provide visual insight regarding the virtual event (unlike a typical transcription of the virtual event). Additionally, by generating the video summary as described herein, video summary device 120 may preserve network resources, storage resources, and/or computing resources, among other examples, associated with obtaining, storing, and/or processing transcriptions of virtual events.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
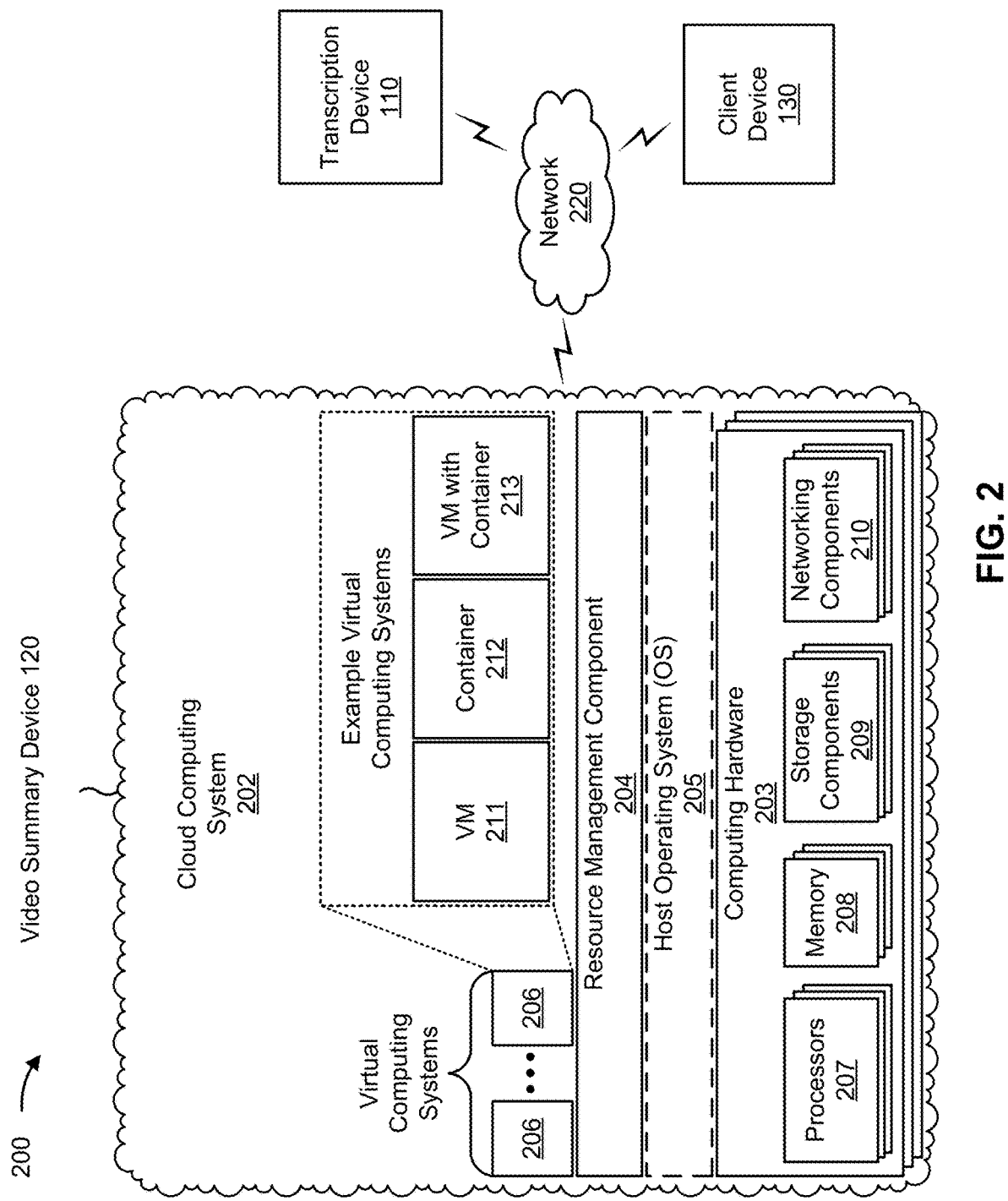
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a video summary device 120, which may include one or more elements of and/or may execute within a cloud computing system 202. The cloud computing system 202 may include one or more elements 203-213, as described in more detail below. As further shown in FIG. 2, environment 200 may include transcription device 110, video summary device 120, and/or a network 220. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the video summary device 120 may include one or more elements 203-213 of the cloud computing system 202, may execute within the cloud computing system 202, and/or may be hosted within the cloud computing system 202, in some implementations, the video summary device 120 may not be cloud-based (e.g., may be implemented outside of a cloud computing system) or may be partially cloud-based. For example, the video summary device 120 may include one or more devices that are not part of the cloud computing system 202, such as device 300 of FIG. 3, which may include a standalone server or another type of computing device. The video summary device 120 may perform one or more operations and/or processes described in more detail elsewhere herein.

Transcription device 110 includes one or more devices capable of receiving, generating, storing, processing, providing, and/or routing information associated with generating a video summary of a virtual event, as described elsewhere herein. Transcription device 110 may include a communication device and/or a computing device. For example, transcription device 110 may include a server, such as an application server, a client server, a web server, a database server, a host server, a proxy server, a virtual server (e.g., executing on computing hardware), or a server in a cloud computing system. In some implementations, transcription device 110 includes computing hardware used in a cloud computing environment.

Client device 130 includes one or more devices capable of receiving, generating, storing, processing, and/or providing information associated with generating a video summary of a virtual event, as described elsewhere herein. Client device 130 may include a communication device and/or a computing device. For example, the client device 130 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
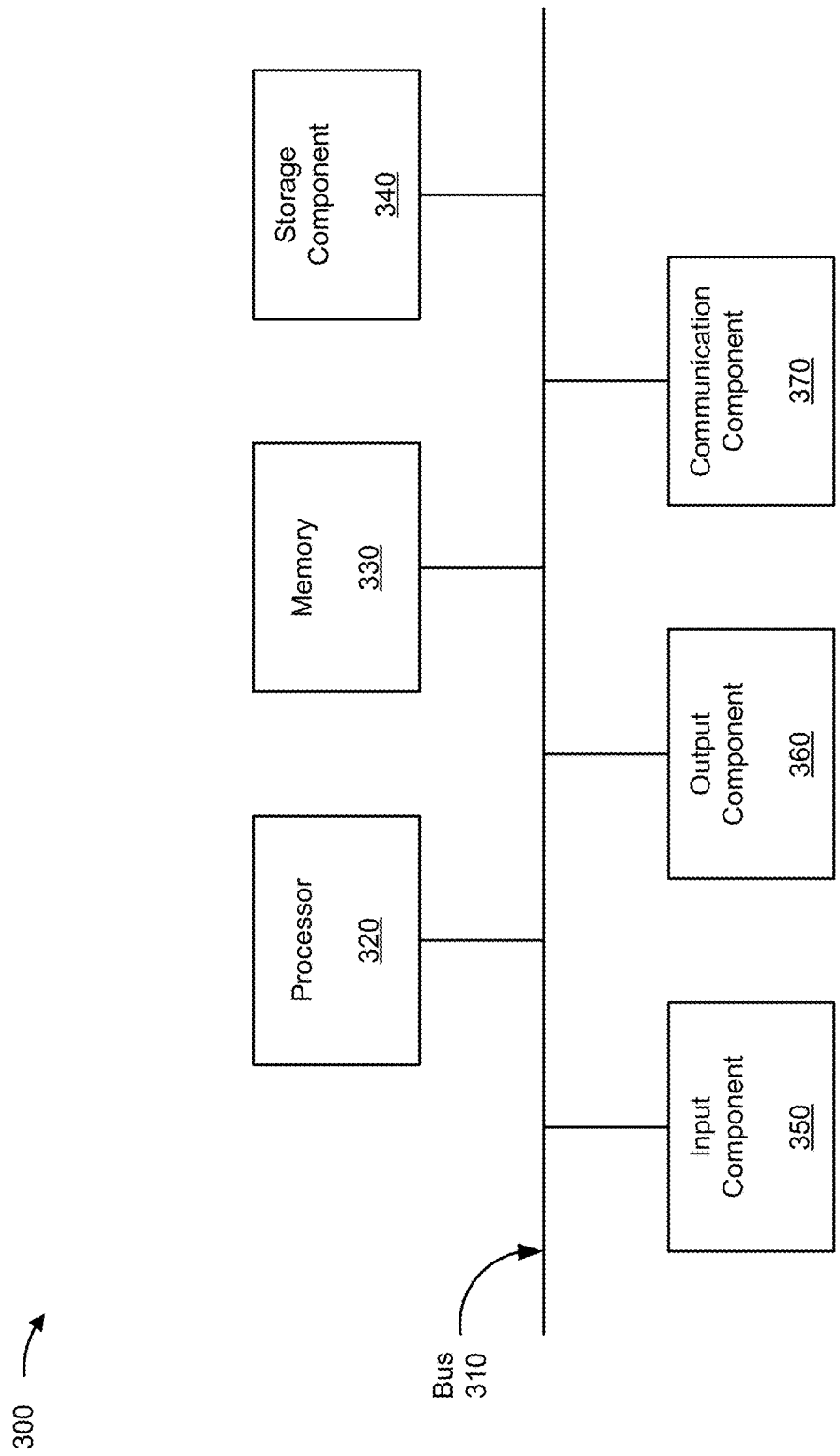
FIG. 3 is a diagram of example components of one or more devices of FIG. 2.

FIG. 3 is a diagram of example components of a device 300, which may correspond to transcription device, video summary device 120, and/or client device 130. In some implementations, transcription device, video summary device 120, and/or client device 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
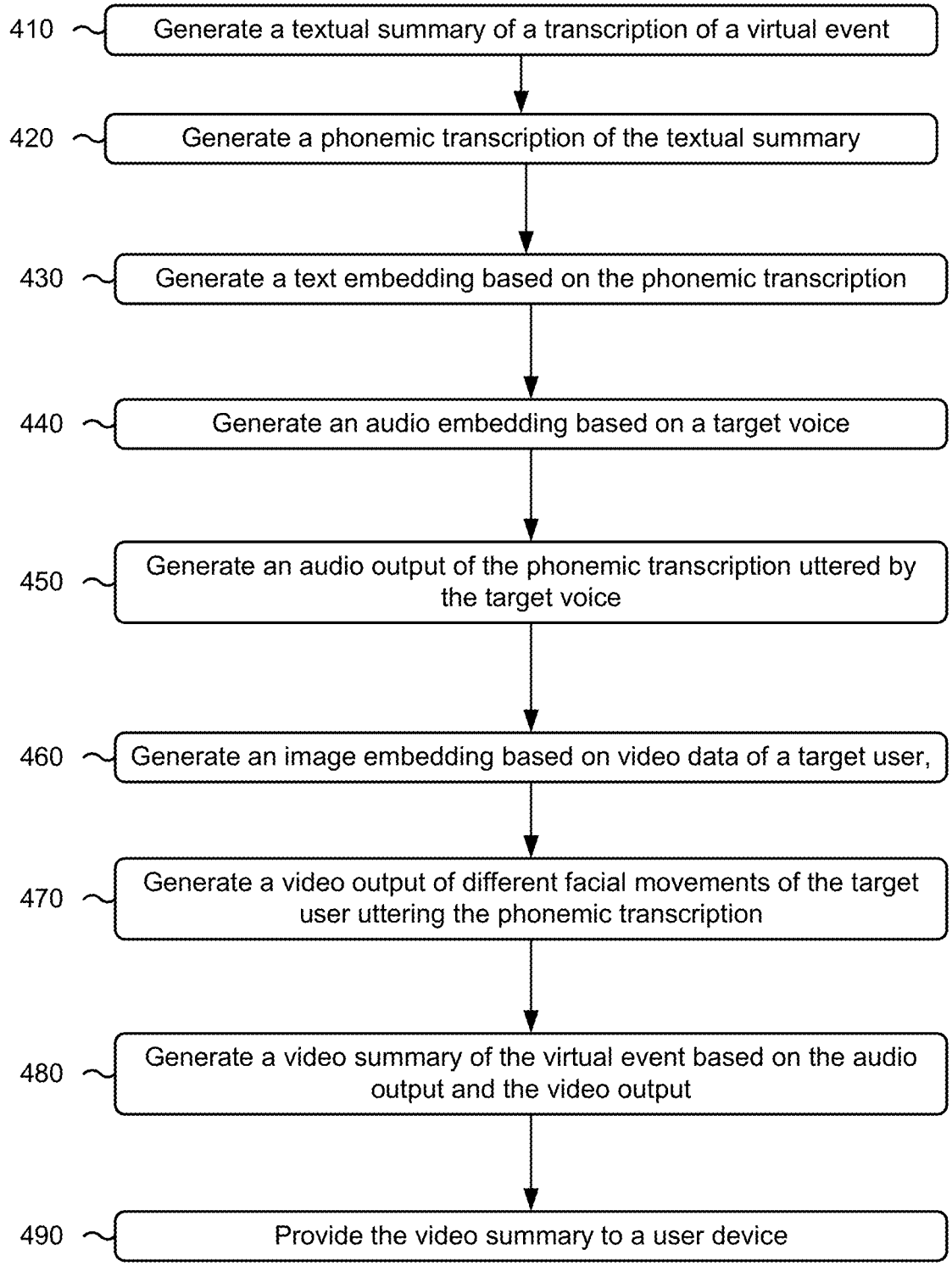
FIG. 4 is a flowchart of an example process relating to generating a video summary of a virtual event.

FIG. 4 is a flowchart of an example process 400 relating to generating a video summary of a virtual event. In some implementations, one or more process blocks of FIG. 4 may be performed by a video summary device (e.g., video summary device 120). In some implementations, one or more process blocks of FIG. 4 may be performed by another device or a group of devices separate from or including the video summary device, such as a transcription device (e.g., transcription device 110) and/or a client device (e.g., client device 130). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include generating a textual summary of a transcription of a virtual event (block 410). For example, the video summary device may generate a textual summary of a transcription of a virtual event, as described above.

As further shown in FIG. 4, process 400 may include generating a phonemic transcription of the textual summary (block 420). For example, the video summary device may generate a phonemic transcription of the textual summary, as described above.

As further shown in FIG. 4, process 400 may include generating a text embedding based on the phonemic transcription, wherein the text embedding includes information regarding text classification of the phonemic transcription (block 430). For example, the video summary device may generate a text embedding based on the phonemic transcription, wherein the text embedding includes information regarding text classification of the phonemic transcription, as described above.

As further shown in FIG. 4, process 400 may include generating an audio embedding based on a target voice, wherein the audio embedding includes information regarding audio classification of the target voice (block 440). For example, the video summary device may generate an audio embedding based on a target voice, wherein the audio embedding includes information regarding audio classification of the target voice, as described above.

As further shown in FIG. 4, process 400 may include generating an audio output of the phonemic transcription uttered by the target voice, wherein the audio output is generated based on the text embedding and the audio embedding (block 450). For example, the video summary device may generate an audio output of the phonemic transcription uttered by the target voice, wherein the audio output is generated based on the text embedding and the audio embedding, as described above.

As further shown in FIG. 4, process 400 may include generating an image embedding based on video data of a target user, wherein the image embedding includes information regarding images of facial movements of the target user (block 460). For example, the video summary device may generate an image embedding based on video data of a target user, wherein the image embedding includes information regarding images of facial movements of the target user, as described above.

As further shown in FIG. 4, process 400 may include generating a video output of different facial movements of the target user uttering the phonemic transcription, wherein the video output is generated based on the text embedding and the image embedding (block 470). For example, the video summary device may generate a video output of different facial movements of the target user uttering the phonemic transcription, wherein the video output is generated based on the text embedding and the image embedding, as described above.

As further shown in FIG. 4, process 400 may include generating a video summary of the virtual event based on the audio output and the video output (block 480). For example, the video summary device may generate a video summary of the virtual event based on the audio output and the video output, as described above.

As further shown in FIG. 4, process 400 may include providing the video summary to a user device (block 490). For example, the video summary device may provide the video summary to a user device, as described above.

In some implementations, the information regarding text classification comprises one or more of information regarding grammatical rules associated with the textual summary, information regarding contexts associated with the textual summary, information regarding semantics associated with the textual summary, or information regarding emotions conveyed by the textual summary, and the information regarding audio classification comprises one or more of information regarding an amplitude of the target voice, information regarding a frequency of the target voice, or information regarding a tone of the target voice.

In some implementations, generating the textual summary comprises processing the transcription to generate a preprocessed input, and processing the preprocessed input, using a machine learning model, to generate the textual summary.

In some implementations, processing the transcription comprises determining a type of utterance for each portion of a plurality of portions of the transcription of the virtual event, and filtering the plurality of portions, based on the type of utterance determined for each portion of the plurality of portions, to generate filtered portions, and generating the textual summary based on the filtered portions.

In some implementations, generating the audio output comprises generating a spectrogram based on the text embedding and the audio embedding, and generating a waveform based on the spectrogram, wherein the audio output includes the waveform.

In some implementations, generating the video output comprises generating a plurality of images for each portion of a plurality of portions of the phonemic transcription, wherein the plurality of images, of a particular portion of the plurality of portions of the phonemic transcription, depict the target user uttering the particular portion, and wherein the video output includes the plurality of images generated for each portion of the plurality of portions of the phonemic transcription.

In some implementations, generating the plurality of images comprises generating, based on the text embedding and the image embedding, a first image of the plurality of images, and generating a second image of the plurality of images after generating the first image, wherein the second image is determined based on the first image, the text embedding, and the image embedding.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a video summary device, the method comprising:
    generating an audio embedding based on a target voice, wherein the audio embedding includes information regarding audio classification of the target voice;
    generating an audio output of a phonemic transcription, of an event, uttered by the target voice, wherein the audio output is generated based on a text embedding and the audio embedding, and wherein the text embedding includes information regarding text classification of the phonemic transcription;
    generating an image embedding based on video data of a target user, wherein the image embedding includes information regarding images of facial movements of the target user;
    generating a video output of different facial movements of the target user uttering the phonemic transcription, wherein the video output is generated based on the text embedding and the image embedding; and
    generating a video summary of the event based on the audio output and the video output.

2. The method of claim 1, further comprising:
    generating the text embedding using a machine learning model trained for text classification.

3. The method of claim 2, wherein generating the text embedding comprises:
    providing the phonemic transcription as an input to the machine learning model,
        wherein the machine learning model generates the text embedding as an output.

4. The method of claim 1, further comprising:
    identifying, as the target voice, a voice of a participant of the event; or
    identifying, as the target voice, a voice of a user that was not a participant of the event.

5. The method of claim 1, wherein generating the audio embedding comprises:
    providing voice samples of the target voice as inputs to a machine learning model trained for audio classification,
        wherein the machine learning model generates the audio embedding based on the voice samples.

6. The method of claim 1, wherein generating the audio output comprises:
    providing the text embedding and the audio embedding as inputs to a machine learning model,
        wherein the machine learning model generates a spectrogram based on the text embedding and the audio embedding; and
    generating the audio output based on the spectrogram.

7. The method of claim 6, wherein generating the audio output comprises:
    generating a waveform based on the spectrogram,
        wherein the audio output includes the waveform.

8. A device, comprising:
    one or more processors configured to:
        generate an audio embedding based on a target voice, wherein the audio embedding includes information regarding audio classification of the target voice;
        generate an audio output of a phonemic transcription, of an event, being uttered by the target voice, wherein the audio output is generated based on a text embedding and the audio embedding, and wherein the text embedding includes information regarding text classification of the phonemic transcription;
        generate an image embedding based on video data of a target user, wherein the image embedding includes information regarding images of facial movements of the target user;
        generate a video output of different facial movements of the target user uttering the phonemic transcription, wherein the video output is generated based on the text embedding and the image embedding; and
        generate a video summary of the event based on the audio output and the video output.

9. The device of claim 8, wherein the one or more processors, to generate the image embedding, are configured to:
    identify the target user based on the target voice,
        wherein the video data includes video data of facial movements of the target user as the target user utters at least one of one or more words or one or more phrases.

10. The device of claim 8, wherein the one or more processors, to generate the image embedding, are configured to:
    provide the video data as an input to a machine learning model trained for image classification,
        wherein the machine learning model generates the image embedding based on the video data.

11. The device of claim 10, wherein the one or more processors are further configured to:
    process a transcription of the event to generate a processed input; and
    provide the processed input as an input to a language model,
        wherein the phonemic transcription is generated by the language model based on the processed input.

12. The device of claim 8, wherein the one or more processors, to generate the video output, are configured to:
    generate a first plurality of images depicting the target user uttering a first portion of a plurality of portions of the phonemic transcription; and
    generate a second plurality of images depicting the target user uttering a second portion of the plurality of portions,
        wherein the video output includes the first plurality of images and the second plurality of images.

13. The device of claim 12, wherein the one or more processors, to generate the audio output, are configured to:
    generate a first image of the first plurality of images; and
    generate a second image of the first plurality of images,
        wherein the second image is generated based on the first image, the text embedding, and the image embedding.

14. The device of claim 13, wherein the one or more processors, to generate the second image, are configured to:
    modify one or more pixel values of the first image to generate the second image.

15. A non-transitory computer-readable medium storing a set of instructions, the set of instructions comprising:
one or more instructions that, when executed by one or more processors of a device, cause the device to:
generate an audio output of a phonemic transcription being uttered by a target voice, wherein the audio output is generated based on a text embedding and an audio embedding, wherein the text embedding includes information regarding text classification of the phonemic transcription, and wherein the audio embedding includes information regarding audio classification of the target voice;
generate a video output of different facial movements of a target user uttering the phonemic transcription, wherein the video output is generated based on the text embedding and an image embedding generated based on video data of the target user, and wherein the image embedding includes information regarding images of facial movements of the target user;
generate a video summary based on the audio output and the video output; and
provide the video summary.

16. The non-transitory computer-readable medium of claim 15, wherein the one or more instructions further cause the device to:
generate the text embedding using a machine learning model trained for text classification,
wherein the phonemic transcription is provided as an input to the machine learning model.

17. The non-transitory computer-readable medium of claim 15, wherein the one or more instructions further cause the device to:
generate the audio embedding using a machine learning model trained for audio classification,
wherein voice samples, of the target voice, are provided as inputs to the machine learning model.

18. The non-transitory computer-readable medium of claim 17, wherein the one or more instructions further cause the device to:
generate the image embedding using a machine learning model trained for image classification,
wherein the video data is provided as an input to the machine learning model.

19. The non-transitory computer-readable medium of claim 18, wherein the one or more instructions, that cause the device to generate the image embedding, cause the device to:
identify the target user based on the target voice,
wherein the video data includes video data of facial movements of the target user as the target user utters at least one of one or more words or one or more phrases.

20. The non-transitory computer-readable medium of claim 15, wherein the one or more instructions, that cause the device to generate the video output, cause the device to:
generate a first plurality of images depicting the target user uttering a first portion of a plurality of portions of the phonemic transcription; and
generate a second plurality of images depicting the target user uttering a second portion of the plurality of portions,
wherein the video output includes the first plurality of images and the second plurality of images.

* * * * *